US010195963B2

(12) United States Patent
Flick et al.

(10) Patent No.: US 10,195,963 B2
(45) Date of Patent: Feb. 5, 2019

(54) LONGITUDINAL ADJUSTER FOR A VEHICLE SEAT, AND VEHICLE SEAT

(71) Applicant: Adient Luxembourg Holding S.à.r.l., Luxembourg (LU)

(72) Inventors: Joachim Flick, Hueckeswagen (DE); Erik Sprenger, Wermelskirchen (DE)

(73) Assignee: Adient Luxembourg Holding S.à.r.l., Luxembourg (LU)

( * ) Notice: Subject to any disclaimer, the term of this patent is extended or adjusted under 35 U.S.C. 154(b) by 0 days.

(21) Appl. No.: 15/520,231

(22) PCT Filed: Oct. 14, 2015

(86) PCT No.: PCT/EP2015/073785
§ 371 (c)(1),
(2) Date: Apr. 19, 2017

(87) PCT Pub. No.: WO2016/062592
PCT Pub. Date: Apr. 28, 2016

(65) Prior Publication Data
US 2017/0305305 A1    Oct. 26, 2017

(30) Foreign Application Priority Data

Oct. 20, 2014 (DE) .................. 10 2014 221 229
Dec. 10, 2014 (DE) .................. 10 2014 225 426

(51) Int. Cl.
*B60N 2/08* (2006.01)
*B60N 2/07* (2006.01)

(52) U.S. Cl.
CPC ......... *B60N 2/0818* (2013.01); *B60N 2/0705* (2013.01); *B60N 2/0715* (2013.01);
(Continued)

(58) Field of Classification Search
CPC ... B60N 2/0818; B60N 2/0806; B60N 2/0875
See application file for complete search history.

(56) References Cited

U.S. PATENT DOCUMENTS 4,712,759 A * 12/1987 Sugama ............... B60N 2/0705
248/429
5,913,947 A * 6/1999 Groche ................ B60N 2/0705
248/429
(Continued)

FOREIGN PATENT DOCUMENTS

DE   30 42 379 A1   6/1982
DE   84 22 275 U1   1/1985
(Continued)

*Primary Examiner* — Eret C McNichols
(74) *Attorney, Agent, or Firm* — McGlew and Tuttle, P.C.

(57) ABSTRACT

A longitudinal adjuster (3), for a vehicle seat (1), includes a lower rail (9), an upper rail (11), moveable in relation to the lower rail (9) in a longitudinal direction (x), and a locking unit (13) for locking the upper rail (11) to the lower rail (9). The locking unit (13) includes two locking elements (VR), which, in order to lock the upper rail (11) and the lower rail (9), engage in the upper rail and the lower rail in a blocking manner in steps such that one of the locking elements (VR) pre-locks the upper rail (11) and the lower rail (9) with play in a pre-locking step and one of the locking elements (VR) locks the upper rail (11) and the lower rail (9) without play in a locking step. A vehicle seat (1) including such a longitudinal adjuster (3) is provided.

18 Claims, 7 Drawing Sheets

(52) U.S. Cl.
CPC ......... *B60N 2/0806* (2013.01); *B60N 2/0843* (2013.01); *B60N 2/0875* (2013.01); *B60N 2205/20* (2013.01)

(56) References Cited

U.S. PATENT DOCUMENTS

| | | | | |
|---|---|---|---|---|
| 5,931,436 | A * | 8/1999 | Rohee | B60N 2/0705 |
| | | | | 248/429 |
| 6,641,104 | B2 * | 11/2003 | Flick | B60N 2/0705 |
| | | | | 248/430 |
| 6,902,235 | B2 * | 6/2005 | Rohee | B60N 2/08 |
| | | | | 248/424 |
| 7,000,880 | B2 * | 2/2006 | Jaudouin | B60N 2/08 |
| | | | | 248/429 |
| 9,132,750 | B2 * | 9/2015 | Jahner | B60N 2/0806 |
| 9,205,763 | B2 * | 12/2015 | Anticuar | B60N 2/0705 |
| 2004/0108762 | A1 | 6/2004 | Borbe | B60N 2/0705 |
| | | | | 297/344.11 |
| 2007/0069099 | A1 * | 3/2007 | Kohmura | B60N 2/0705 |
| | | | | 248/430 |
| 2007/0095596 | A1 * | 5/2007 | Beneker | B60N 2/0806 |
| | | | | 180/326 |
| 2008/0315662 | A1 * | 12/2008 | Suck | B60N 2/0806 |
| | | | | 297/463.1 |
| 2009/0218843 | A1 * | 9/2009 | Wojatzki | B60N 2/0705 |
| | | | | 296/65.13 |
| 2009/0289485 | A1 * | 11/2009 | Walter | B60N 2/0705 |
| | | | | 297/344.1 |
| 2010/0026070 | A1 * | 2/2010 | Rohee | B60N 2/0248 |
| | | | | 297/344.1 |
| 2010/0102192 | A1 | 4/2010 | Tarusawa et al. | |
| 2011/0089305 | A1 * | 4/2011 | Yamada | B60N 2/071 |
| | | | | 248/429 |
| 2011/0240820 | A1 * | 10/2011 | Napau | B60N 2/0705 |
| | | | | 248/429 |
| 2012/0074287 | A1 * | 3/2012 | Wojatzki | B60N 2/0818 |
| | | | | 248/429 |
| 2012/0132778 | A1 * | 5/2012 | Nakamura | B60N 2/0705 |
| | | | | 248/429 |
| 2012/0205512 | A1 * | 8/2012 | Fujishiro | B60N 2/0705 |
| | | | | 248/429 |
| 2013/0119222 | A1 * | 5/2013 | Hayashi | B60N 2/0705 |
| | | | | 248/429 |
| 2014/0224954 | A1 * | 8/2014 | Oh | B60N 2/0705 |
| | | | | 248/429 |
| 2015/0291062 | A1 * | 10/2015 | Yamada | B60N 2/0705 |
| | | | | 384/47 |
| 2016/0039314 | A1 * | 2/2016 | Anticuar | B60N 2/0806 |
| | | | | 248/429 |

FOREIGN PATENT DOCUMENTS

| | | | | |
|---|---|---|---|---|
| DE | 44 00 474 | C1 | 3/1995 | |
| DE | 44 03 310 | A1 | 8/1995 | |
| DE | 102 06 300 | B4 | 12/2005 | |
| DE | 102008025274 | A1 * | 12/2009 | ......... B60N 2/0705 |
| DE | 102011101281 | B3 * | 5/2012 | ......... B60N 2/0818 |
| DE | 10 2008 056 683 | B4 | 9/2012 | |
| EP | 0 567 226 | A1 | 10/1993 | |
| FR | 2 829 974 | A1 | 3/2003 | |
| FR | 2 886 588 | A1 | 12/2006 | |
| FR | 2886588 | A1 * | 12/2006 | ......... B60N 2/0705 |
| JP | H06-48230 | A | 2/1994 | |
| JP | H10-315822 | A | 12/1998 | |
| JP | 2004-510630 | A | 4/2004 | |
| JP | 2010100171 | A * | 5/2010 | ......... B60N 2/0806 |
| JP | 2012-061993 | A | 3/2012 | |
| WO | 02/30702 | A1 | 4/2002 | |

* cited by examiner

FIG 12

LONGITUDINAL ADJUSTER FOR A VEHICLE SEAT, AND VEHICLE SEAT

CROSS REFERENCE TO RELATED APPLICATIONS

This application is a United States National Phase Application of International Application PCT/EP2015/073785, filed Oct. 14, 2015, and claims the benefit of priority under 35 U.S.C. § 119 of German Applications 10 2014 221 229.4, filed Oct. 20, 2014 and 10 2014 225 426.4 filed Dec. 10, 2014, the entire contents of which are incorporated herein by reference.

FIELD OF THE INVENTION

The invention relates to a longitudinal adjuster for a vehicle seat. Furthermore, the invention relates to a vehicle seat comprising such a longitudinal adjuster.

BACKGROUND OF THE INVENTION

DE 10 2008 056 683 B4 discloses a longitudinal adjuster which comprises at least one lower rail and at least one upper rail which is displaceable in the longitudinal direction relative to the lower rail, and, for the play-free locking of said lower and upper rails, comprises at least two locking units for locking the upper rail in relation to the lower rail.

SUMMARY OF THE INVENTION

It is an object of the present invention to specify a longitudinal adjuster for a vehicle seat, said longitudinal adjuster being improved in relation to the prior art, and an improved vehicle seat.

The object is achieved according to the invention with a longitudinal adjuster for a vehicle seat, wherein the longitudinal adjuster comprises at least one lower rail, at least one upper rail which is displaceable in the longitudinal direction in relation to the lower rail, and at least one locking unit for locking the upper rail in relation to the lower rail with at least two locking mechanisms arranged on the upper rail, wherein, for locking upper rail and lower rail, the locking mechanisms engage in the upper rail and lower rail in a stepwise blocking manner such that, in a prelocking step, the locking elements prelock the upper rail and lower rail with respect to each other with play, and in that, in a locking step, at least one of the locking mechanism locks the upper and lower rail to each other in a manner free from play (without play).

The advantages achieved with the invention consist in particular in that deformation travel customary in the prior art for a first locking element in order to shift a further locking element in a load path is not required.

In a refinement of the longitudinal adjuster, the locking mechanism is designed as a substantially plate-like (plate-shaped) locking element and/or a lever-shaped locking element. By means of a design of the locking mechanism as a substantially plate-shaped locking element, an outlay of production and installation is low. By means of a design of the locking mechanism is a substantially lever-shaped locking element, a nested or intermeshing arrangement of a plurality of lever-shaped locking elements is possible, wherein an advantage of a small construction space arises here.

A further refinement of the longitudinal adjuster provides an actuating element for locking or unlocking the locking unit, wherein, when the actuating element is actuated, the locking unit is bringable from a locking position into an unlocked position, and, after adjustment of the vehicle seat and with the actuating element unactuated, the locking unit is adjustable in a stepwise manner from the unlocked position via a prelocking position into the locking position. Simple actuation of the locking unit is possible by means of the actuating element, wherein when the actuating element is unactuated, secure locking of the upper and lower rails is ensured in all positions of the locking unit.

In another refinement of the longitudinal adjuster, when the actuating element is unactuated, one of the locking mechanisms is arranged in a prelocking position. When the actuating element is unactuated, a relative movement of upper rail and lower rail in the prelocking position is therefore always restricted and an adjustment of the vehicle seat beyond the restricted relative movement is no longer possible. The restricted movement of one of the rails in relation to the other rail then leads to locking of both rails by one of the locking mechanisms then dropping into the locking position.

In a development of the longitudinal adjuster, a locking mechanism has a multiplicity of latching teeth and, for example, is configured in such a manner that at least one of the latching teeth is wider than all of the other latching teeth. It is possible by means of the latching teeth to produce a connection of the locking mechanism at least to the upper rail, wherein the at least one wide latching tooth is provided for transmitting force between the locking mechanism associated therewith and the lower rail since a play-free connection (without play) is produced only between the wide latching tooth and the lower rail. When a play-free connection is present, movement of the wide latching tooth in an associated recess is not possible. A movement clearance between a latching tooth and the associated recess is accordingly referred to as play.

In another development of the longitudinal adjuster, the upper rail is provided with a number of recesses which corresponds at least to the number of latching teeth of the locking mechanisms. One latching tooth is assigned to precisely one recess. By means of the recesses accommodating the latching teeth, a permanent connection of the upper rail to the locking mechanisms even during the adjustment of the seat is provided.

According to an embodiment of the longitudinal adjuster, the upper rail has a number of recesses in mutually opposite side walls per locking mechanism. For example, here, the recesses in the one side wall are identical and the recesses in the opposite side wall differ at least in one parameter. A design of the locking mechanism with latching teeth of differing width is therefore possible, wherein the locking mechanism accordingly has latching teeth of identical design on one side.

In another embodiment of the longitudinal adjuster, the recesses differing at least in one parameter are introduced into the upper rail in a manner lying diagonally opposite one another. A resulting arrangement of the locking mechanisms which is laterally reversed in the longitudinal direction is therefore possible, as a result of which the locking mechanisms are arrangeable in such a manner that they always take up different positions in the locking direction.

In another development of the longitudinal adjuster, the respective locking element, in particular the respective substantially plate-shaped locking element, is designed as a latching plate with latching teeth which are arranged one behind another in the longitudinal direction on both longitudinal edges and are arranged moveably in the locking direction at least in corresponding recesses of the upper rail. The movability of the locking element in the locking direction permits simple actuation of same, wherein, with the design of the latching plate, an outlay on production and installation is straight-forward and cost-effective. The respective latching plate is expediently oriented substantially horizontally, i.e. a normal vector of the respective latching plate is expediently oriented substantially parallel to the locking direction and therefore expediently substantially parallel to the vertical axis of the vehicle. The actuating direction is the direction in which the locking mechanisms or at least the teeth thereof are substantially moved for locking and unlocking. In the case of the substantially lever-shaped locking mechanisms, the latter are expediently pivoted in such a manner that the teeth thereof move substantially upward or downward in order to lock or to unlock. Said up and down movement of the teeth in the case of the lever-shaped locking mechanisms can be a partial movement of a pivoting movement of the teeth because of the pivoting movement of the lever-shaped locking mechanisms, i.e. the teeth pivot laterally and upward or laterally and downward in the opposite direction in order to lock or to unlock.

In a further embodiment of the longitudinally adjuster, the one locking element is arranged in relation to the other locking element adjacent and laterally reversed in the longitudinal direction. It is therefore possible for the locking elements always to take up different positions in the locking direction. This is likewise possible if the locking elements are arranged precisely one behind another.

According to a development of the longitudinal adjuster, the upper rail has, per locking mechanism at least one recess which is wider in the longitudinal direction than the other recesses. The at least one wider recess is therefore designed as a receptacle for the wide latching tooth and ensures guidance of the latter in the locking direction. The already described play-free connection of the wide latching tooth to the lower rail is not restricted.

In another development of the longitudinal adjuster, the upper rail has, per locking mechanism, at least one recess which is of conical design in contrast to the other recesses. By means of the conical design of the recess, the latter in the locking position accommodates a latching tooth in such a manner that force can be transmitted from the upper rail to the locking mechanism.

In a further refinement of the longitudinal adjuster, the recess is of conical design in the locking direction in such a manner that said recess guides a latching tooth of the associated locking mechanism such that said latching tooth latches in the locking position without play or in a manner free from play. Therefore, only the conically designed recess and one latching tooth per locking mechanism are in force-transmitting engagement with the upper rail, wherein only one of the two locking mechanisms ever latches in a manner free from play. The second locking mechanism serves only to absorb collision loads after a slight deformation because of a force acting due to a collision.

According to another development of the longitudinal adjuster, the lower rail has a multiplicity of formations spaced apart at equal distances, wherein a formation expediently in each case has a projection, a web and a catch. The formations are designed as receptacles for the latching teeth, wherein the projection, the web and the catch expediently have different heights in the locking direction. They are expediently arranged in a step-shaped manner one behind the other in the longitudinal direction of the lower rail. In the locking direction, i.e. expediently in a direction parallel to a vertical axis of the vehicle, the projection here forms the lowest step and the catch the highest step or vice versa. A latching tooth which is dropped or latched into the catch is arranged here in the locking position, and a latching tooth arranged on the web is arranged in the prelocking position. The formations are expediently formed in one side wall or in opposite side walls of the lower rail.

In a refinement of the longitudinal adjuster, the catch is of conical design at its flanks in such a manner that only the wide latching tooth of one of the locking mechanisms latches without play. The other latching teeth latch here in the catch with play. The transmission of force is therefore ensured exclusively by means of the wide latching tooth.

By means of the play-free connection of the wide latching tooth to the lower rail and the play-free connection of the latching tooth to the conical recess of the upper rail, a force only from the upper rail onto the latching tooth in the conical recess is therefore transmitted via the wide latching tooth to the lower rail. The latching teeth arranged with play in the other recesses of the upper rail and in the formations in the lower rail are not force-transmitting in a normal operation of the longitudinal adjuster. They are provided exclusively for a collision situation of the vehicle. Forces acting during the collision may result in deformation of the latching teeth arranged without play, wherein the latching teeth arranged up to now with play are shifted because of the deformation onto the respective recess or formation in a force-transmitting manner.

A vehicle seat comprising such a longitudinal adjuster is always in a locked state when the actuating element is unactuated, wherein a longitudinal displacement of the vehicle seat not desired by the user is avoided in an advantageous manner.

Exemplary embodiments of the invention are explained in more detail with reference to drawings. The present invention is described in detail below with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 4A is a schematic partially sectioned perspective partial view showing the pair of rails illustrated in FIG. 3;

DESCRIPTION OF THE PREFERRED EMBODIMENTS

Referring to the drawings, mutually corresponding parts are provided with the same reference signs throughout the Figures.

Figure 1:
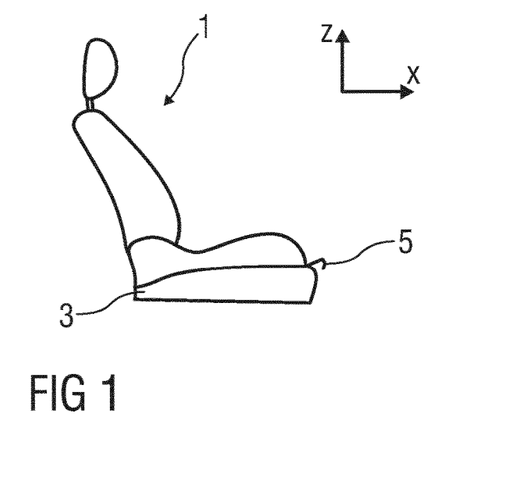
FIG. 1 is a schematic side view showing a vehicle seat with a longitudinal adjuster.

FIG. 1 shows a vehicle seat 1 of a vehicle in a side view. The vehicle seat 1 has an actuating element 5 which is connected to a longitudinal adjuster 3 and upon actuation of which the longitudinal adjuster 3 permits the vehicle seat 1 to be displaced along a longitudinal direction x, wherein the latter runs substantially parallel to the direction of travel. The vehicle seat 1 has a respective pair of rails 7 (illustrated in more detail in FIG. 2) on both vehicle seat sides in the longitudinal direction x.

Figure 2:
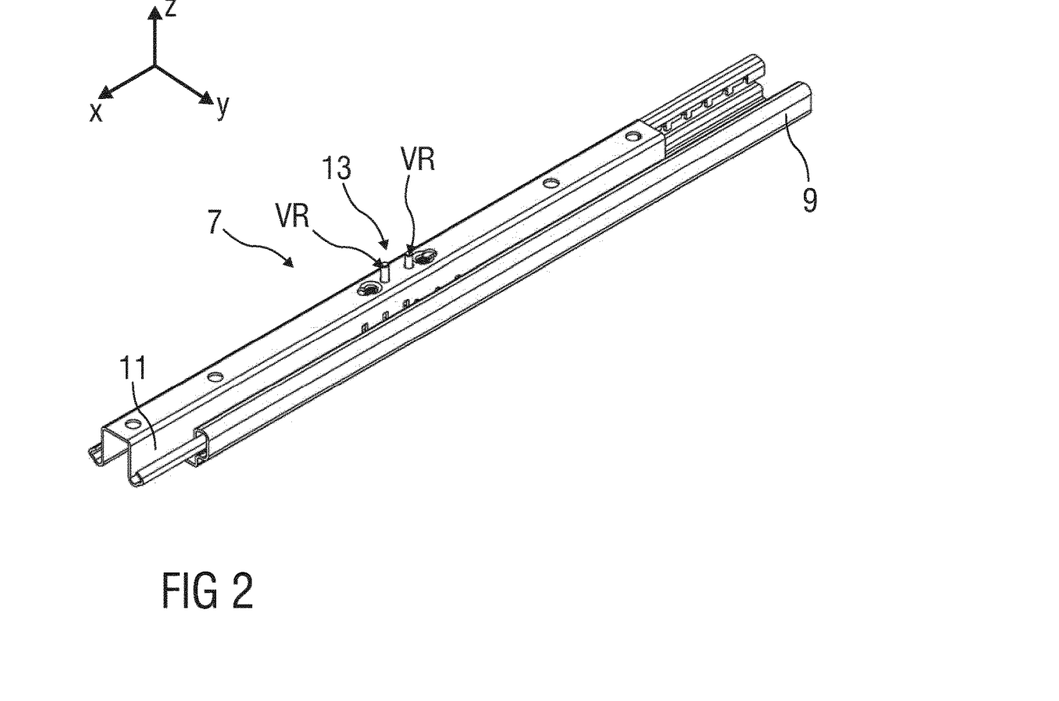
FIG. 2 is a schematic perspective view showing a pair of rails of the longitudinal adjuster.

FIG. 2 shows one of the pairs of rails 7 of the longitudinal adjuster 3 in a perspective illustration. The two pairs of rails 7 are constructed analogously here.

The illustrated pair of rails 7 comprises a lower rail 9 and an upper rail 11, wherein the lower rail 9 is connected to a vehicle structure of the vehicle and the upper rail 11 is arranged on the lower rail 9.

The upper rail 11 is displaceable in the longitudinal direction x relative to the lower rail 9 and is lockable to the lower rail 9 by means of a locking unit 13. In this case, the lower rail 9 and the upper rail 11 engage around each other with their substantially U-shaped profiles having respectively inwardly and outwardly bent longitudinal edges.

Figure 3:
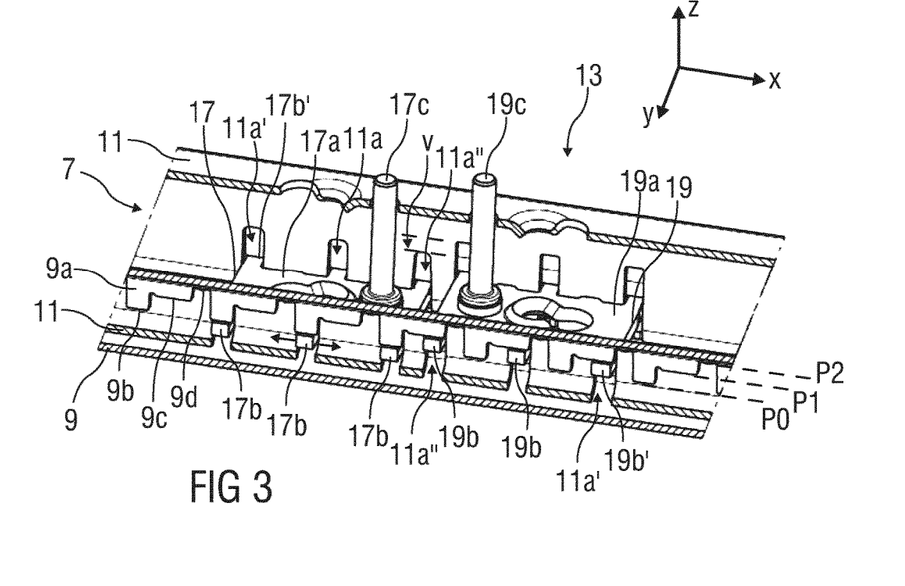
FIG. 3 is a schematic partially sectioned perspective partial view showing the pair of rails in the region of a locking unit of the longitudinal adjuster which is in a prelocked state.

FIG. 3 shows a partially sectioned perspective partial view of the pair of rails 7 in the region of the locking unit 13 in a prelocked state.

For the stepwise locking—prelocking and locking—of lower rail 9 and upper rail 11, the locking unit 13 has two locking elements 17, 19. The locking elements 17, 19 are arranged one behind another in the longitudinal direction x and are identical in construction and manner of operation, wherein the one locking element 17 is arranged rotated by 180° about an axis of the locking direction z in relation to the further locking element 19 in a fitted position.

The locking unit 13 comprises at least the two locking elements 17, 19. However, the number of locking elements 17, 19 and the arrangement thereof can also vary, i.e. can be at least two or more than two.

For the longitudinal adjustment of the vehicle seat 1, the actuating element 5 is actuated, as a result of which the longitudinal adjuster 3 is unlocked by the locking unit 13 being brought from a locking position P2 into an unlocked position P0 and, after adjustment of the vehicle seat 1 and with the actuating element 5 unactuated, is adjusted in a stepwise manner from the unlocked position P0 via the illustrated prelocking position P1 into the locking position P2 or, in a corresponding position of the lower rail 9 and the upper rail 11 with respect to each other, is brought directly from the unlocked position P0 into the locking position P2.

After adjustment of the vehicle seat 1 and release of the actuating element 5, the two locking elements 17, 19 in the example illustrated are adjusted from the unlocked position P0 of the locking unit 13 in such a manner that one of the locking elements 17, 19, namely the locking element 19, takes up the prelocking position P1 with play, and the other locking element 17 still remains in the unlocked position P0. By this means, in the prelocking position of the locking unit 13, movement of the upper rail 11 relative to the lower rail 9 in both directions is possible to a limited extent before the upper and lower rail 11, 9 are blocked with respect to each other. In other examples, with a corresponding position of the lower rail 9 and of the upper rail 11 with respect to each other, one of the locking elements 17, 19 can also take up the prelocking position P1 and the other locking element 17, 19 can directly take up the locking position P2.

Figure 4A:
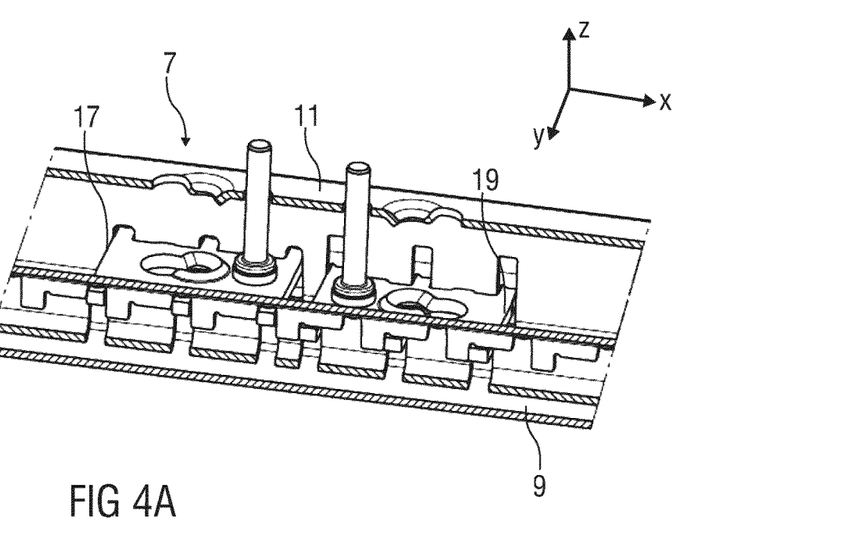
Figure 5:
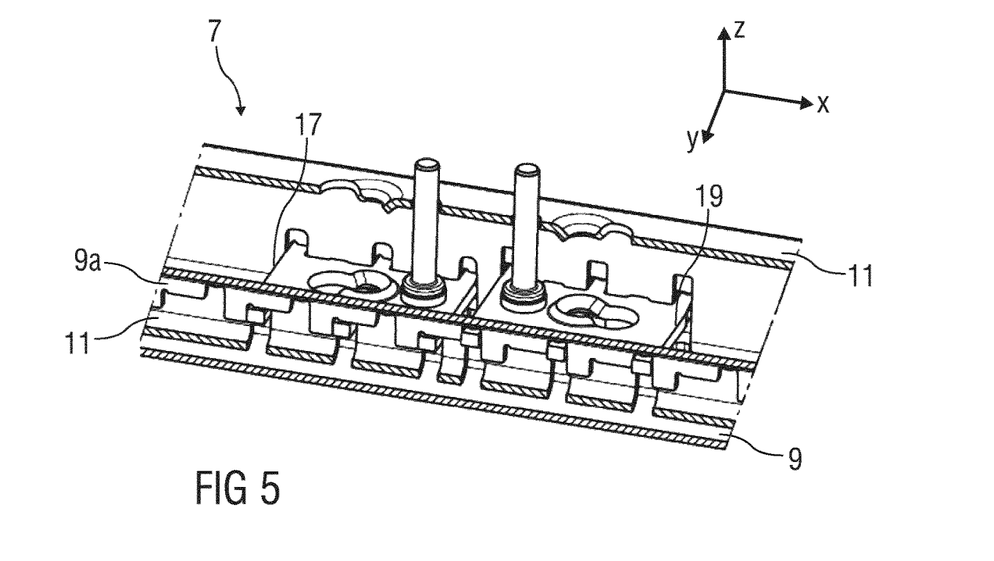
FIG. 5 is a schematic view showing the partial view illustrated in FIG. 3 of the pair of rails of the longitudinal adjuster in the locked state, wherein another locking element is latched in a locking position.

In the example illustrated, it is ensured by further movement of the vehicle seat 1 from the prelocking position of the locking unit 13 forward or rearward in the longitudinal direction x that one of the locking elements 17, 19 securely drops or latches into the locking position P2, as illustrated in FIG. 4A or 5, wherein the situation after the movement of the vehicle seat 1 to the rear, i.e. counter to the direction of travel, is illustrated in this exemplary embodiment in FIG. 4A, and the situation after movement of the vehicle seat 1 forward, i.e. in the direction of travel and therefore in the longitudinal direction x, is illustrated in FIG. 5.

Stepless locking of the longitudinal adjuster 3 is therefore made possible, wherein, in the respective locking steps—prelocking step or locking step only one of the locking elements 17, 19 is in the respective step, the prelocking position P1 or the locking position P2. However, the longitudinal adjuster 3 is designed in such a manner that all of the locking elements 17, 19, the two locking elements 17, 19 in the example illustrated, can take up both the prelocking position P1 and the locking position P2, wherein it depends in each case on the orientation of the upper rail 11 and the lower rail 9 with respect to each other whether the particular locking element 17, 19 is in the prelocking position P1 or in the locking position P2.

Various locking steps are possible here:

locking movement of one of the locking elements 17, 19 from the unlocked position P0 directly into the locking position P2;

locking movement of one of the locking elements 17, 19 from the unlocked position P0 via the prelocking position P1 into the locking position P2, or locking movement of one of the locking elements 17, 19 from the unlocked position P0 into the prelocking position P1.

The two locking elements 17, 19 here are always in different locking steps and not in one and the same step.

FIG. 3 shows the one locking element 17 in the unlocked position P0 and the further locking element 19 in the prelocking position P1, and therefore the locking unit 13 is prelocked. That is to say, the upper rail 11 and the lower rail 9 are adjustable to a restricted extent with respect to each other.

Since the locking elements 17, 19 have an identical construction, a detailed description of them is undertaken below only with reference to the locking element 17, wherein structural features relating to the lower rail 9 and/or the upper rail 11 are designed identically for the locking element 19 on the lower rail 9 and on the upper rail 11.

The locking element 17 has a basic body 17a which is of plate-shaped design in the form of a latching plate. On the longitudinal side, the basic body 17a has a number of protruding latching teeth 17b, of which, in the example illustrated, at least one—the latching tooth 17b'—is of a different size from the remaining latching teeth 17b.

In the exemplary embodiment shown, the latching tooth 17b' has a greater width than the remaining latching teeth 17b. Furthermore, the latching tooth 17b' is referred to as the wider latching tooth 17b'. The wider latching tooth 17b' is in particular an outer tooth of the latching plate, as seen in the longitudinal direction x.

In the exemplary embodiment shown, five latching teeth 17b and the wider latching tooth 17b' are formed on the longitudinal edges of the basic body 17a. The outer position of the wider latching tooth 17b' in the longitudinal direction x is in particular formed to the rear in the direction of travel and, adjacent thereto, two latching teeth 17b are formed to the front in the direction of travel. Opposite thereto, three identical latching teeth 17b are formed on the right longitudinal edge.

Analogously to the construction of the locking element 17, the locking element 19 has a basic body 19a and latching teeth 19b, 19b'.

In other words: the two locking elements 17, 19 have a number of identical latching teeth 17b, 19b on one longitudinal side and a corresponding number of latching teeth 17b, 19b on the opposite longitudinal side, wherein, in this example, one of said latching teeth 17b', 19b' is of wider design and all of the other latching teeth 17b, 19b are of identical design.

The number of latching teeth 17b can vary, wherein the latter can be formed on one side or both sides of a longitudinal edge of the basic body 17a.

The two locking elements 17, 19 are held in the upper rail 11. For this purpose, the upper rail 11 has corresponding dimensions and shapes.

In particular, the upper rail 11 has a number of recesses 11a to 11a" corresponding to the number of latching teeth 17b, 19b. That flank or side of the upper rail 11 which lies opposite the longitudinal side of the latching plate with the identical latching teeth 17b, 19b has correspondingly designed and identical recesses 11a in which the identical latching teeth 17b, 19b engage with play (tolerance).

On the opposite flank or side of the upper rail 11 that, in this example, lies opposite the longitudinal side of the latching plate with different latching teeth 17b, 17b', 19b, 19b', the upper rail 11 has differently designed recesses 11a to 11a" in a manner corresponding to the different latching teeth 17b, 17b', 19b, 19b' in this example. If, in other examples, all of the latching teeth 17b, 17b', 19b, 19b' are of identical design, this expediently also applies to the recesses 11a to 11a".

In detail, the upper rail 11 has, on the right in the direction of travel, three recesses 11a which guide the latching teeth 17b and are designed in such a manner that the latching teeth 17b are movable in the locking direction z.

On the left in the direction of travel, the upper rail 11 in this example has at the rear a recess 11a' which guides the wider latching tooth 17b' and is wider in the longitudinal direction x than the recess 11a which is adjacent at the front in the direction of travel. In this example, in contrast to the recess 11a, a left front recess 11a" in the direction of travel is of conical design at the closed locking end in the locking direction z and guides the latching tooth 17b in such a manner that the latter latches in the locking position P2 without play (into the recess 11a") and therefore the upper rail 11 is locked merely by means of engagement of the latching tooth 17b in the recess 11a" without play. In a travel mode, a force acting on the upper rail 11 is therefore transmitted exclusively by the latching tooth 17b and the recess 11a" to the locking element 17.

A vertical offset V between the recesses 11a, 11a', 11a" of the one locking element 17 and the recesses 11a of the further locking element 19 is provided in order to facilitate installation of the locking element 17, 19 in the upper rail 11.

The lower rail 9 has a multiplicity of formations 9a, wherein each formation 9a has a projection 9b, or web 9c and a catch 9d. The lower rail 9 preferably has the formations 9a distributed over the entire longitudinal extent and spaced apart from one another at equal distances.

Figure 7:
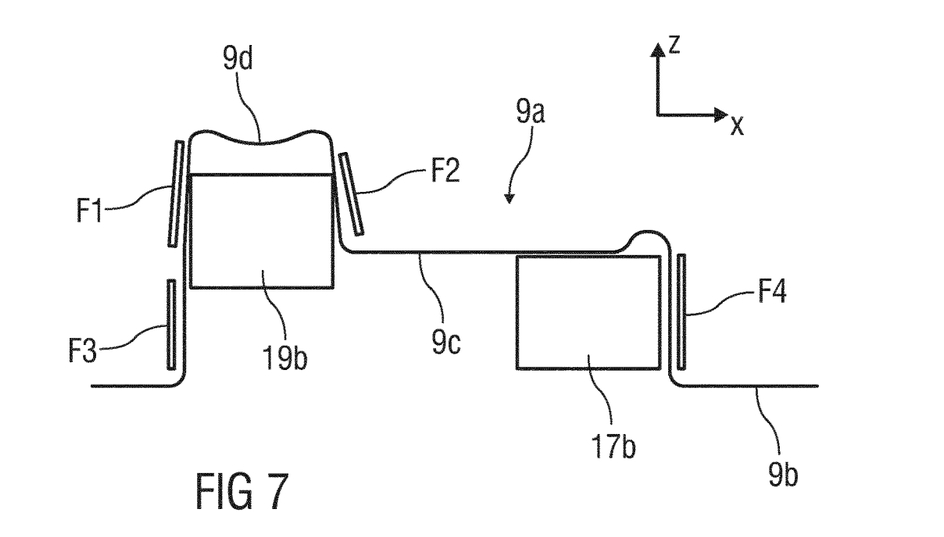
FIG. 7 is a schematic view showing in side view a detail of a latching geometry on a lower rail of the pair of rails illustrated in FIG. 5.

In this example, the catch 9d is of conical design at its flanks F1, F2, illustrated in more detail in FIG. 7, such that the respective latching tooth 17b latches with play, and the wide latching tooth 17b' latches without play, into the catch 9d. The force is therefore transmitted from the locking element 17 to the lower rail 9 exclusively by the wide latching tooth 17b' in the catch 9d. In the travel mode, the remaining latching teeth 17b are not in force-transmitting engagement with the rails 9, 11. If the force exceeds a predetermined limit value, the two force-transmitting latching teeth 17b, 17b' are deformed. Owing to this deformation, the play between the further latching teeth 17b and the recesses 11a, 11a' is reduced until said latching teeth and recesses are in contact. The further latching teeth 17b therefore transmit the force to the locking element 17 and act in a supporting manner in a crash situation.

The at least two locking elements 17, 19 are arranged in such a manner that, when the actuating element 5 is released, the two locking elements 17, 19 are always in engagement with the rails 9, 11 in different positions of the locking action (P0, P1, P2).

In the unlocked position P0, the latching teeth 17b, 17b' rest on an associated projection 9b of the lower rail 9. A movement of the vehicle seat 1 is possible in both directions along the longitudinal direction x.

In the prelocking position P1, the vehicle seat 1 has been displaced further in the direction of travel in relation to the unlocked position P0. The latching teeth 17b, 17b' rest on the respective web 9c and strike against the respective projections 9b which only permit a further movement in the direction of travel. This prelocking position therefore prevents movement of the vehicle seat 1 counter to the direction of travel.

In the prelocking position P1 or else in a first step of a locking mechanism of the longitudinal adjuster 3, safety locking takes place which ensures a load absorption capability in both loading directions of the longitudinal direction x immediately after the actuating element 5 is released. This first step of the locking mechanism has play and therefore no inclined flanks F3, F4 (vertical flanks or stops) which would assist an opening due to a crash load or crash impulses. That is to say, the third flank F3 and/or the fourth flank F4 are not inclined in the same manner as the first flank F1 and/or the second flank F2. The first step of the locking mechanism or load absorption step is therefore free from influences of a chain of tolerances. In a further embodiment, the third flank F3 and/or the fourth flank F4, in particular the third flank F3, can be slightly inclined, for example at an angle of 0° to 6°, in particular 0° to 3°, in particular 3°.

In the locking position P2, the vehicle seat 1 has been displaced further in the direction of travel in relation to the prelocking position P1, as a result of which the latching teeth 17b, 17b' engage in a latching manner in the associated catch 9d. The latching teeth 17b, 17b' are latched in the respective catch 9d, wherein here only the wide latching tooth 17b' latches without play in the associated catch 9d.

From the basic body 17a, 19a, a guide pin 17c, 19c penetrates upward in the locking direction z through an opening O1 in the upper rail 11. An opening O2 serves as a receptacle for a tension spring 21 which is illustrated in more detail in FIG. 6 and prestresses the locking element 17, 19 in the locking direction z. The opening O1 has a larger diameter than the diameter of the guide pin 17c, 19c. The tension spring 21 is hooked on the locking element 17, 19, which is designed as the latching plate, and the upper rail 11, wherein the tension spring 21 does not have any contact with the guide pin 17c, 19c.

Under a maximum action of force by means of the actuating element 5 on the guide pins 17c, 19c, the locking elements 17, 19 are pressed downward in the locking direction z in such a manner that contact with the lower rail 9 is interrupted and therefore the displacement of the upper rail 11 in relation to the lower rail 9 can be carried out.

When the actuating element 5 is released, the latter does not exert any further force on the guide pins 17c, 19c of the locking elements 17, 19, said guide pins being pulled upward in the locking direction z owing to the prestress of the respective tension springs 21.

Alternatively, in embodiments (not illustrated) of what is referred to as a "PEL" locking mechanism (PEL=permanent engaged locking), two and more locking elements 17, 19 are possible. Customarily, two to five locking elements are used.

FIG. 4A shows a partially sectioned perspective partial view of the pair of rails 7 illustrated in FIG. 3, wherein the locking element 17 latches in the locking position P2. The upper rail 11 of the pair of rails 7 illustrated in FIG. 3 has been displaced to the left. The locking element 17 is latched in the locking position P2, and the further locking element 19 is in the prelocking position P1. By the latching teeth 17b, 17b' dropping into the associated catches 9d and by the latching teeth 19b striking against the respective projection 9b, the displacement is restricted, wherein the upper rail 11 and the lower rail 9 are locked without play. The locking element 17 is arranged in a manner free from play (=without play) by means of the latching tooth 17b' because of the latching geometry (illustrated in FIG. 7) of the catches 9d.

Figure 4B:
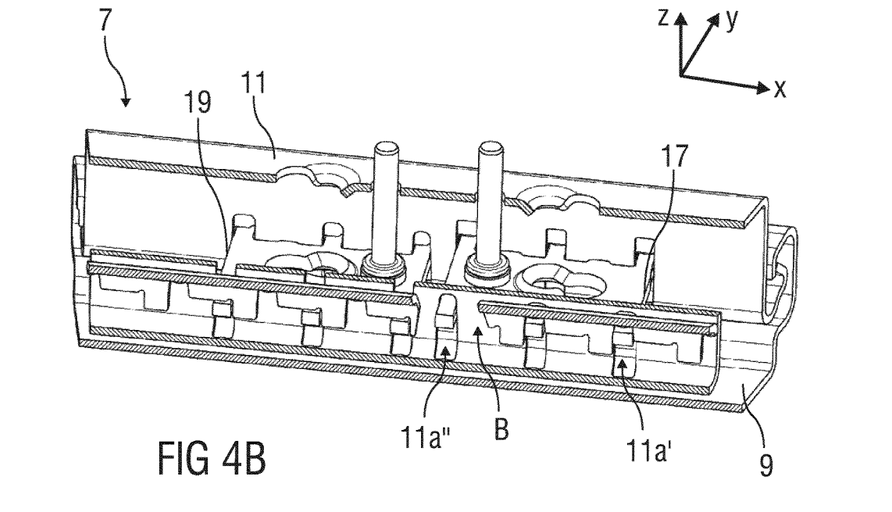
FIG. 4B is a schematic view showing the opposite side of the partial view illustrated in FIG. 4A of the pair of rails.

FIG. 4B shows the opposite side of the partial view illustrated in FIG. 4A of the pair of rails 7. Additionally to the illustration shown in FIG. 4A, the lower rail 9 is illustrated interrupted in a region B, wherein the conical formation at the locking end of the recess 11a can be seen.

FIG. 5 shows a further exemplary embodiment of the pair of rails 7 illustrated in FIG. 3, wherein the further locking element 19 is latched in the locking position P2. The upper rail 11 has been displaced to the right from the first state illustrated in FIG. 3. Unlike in FIG. 4A, the displacement is restricted by the latching teeth 19b, 19b' of the locking element 19 dropping into the respective catch 9d and is subsequently prevented by the latching engagement. Although the latching teeth 17b of the other locking element 17 come into engagement with the respective web 9c during the shifting of the upper rail 11, said latching teeth do not transmit any force in this direction.

Figure 6:
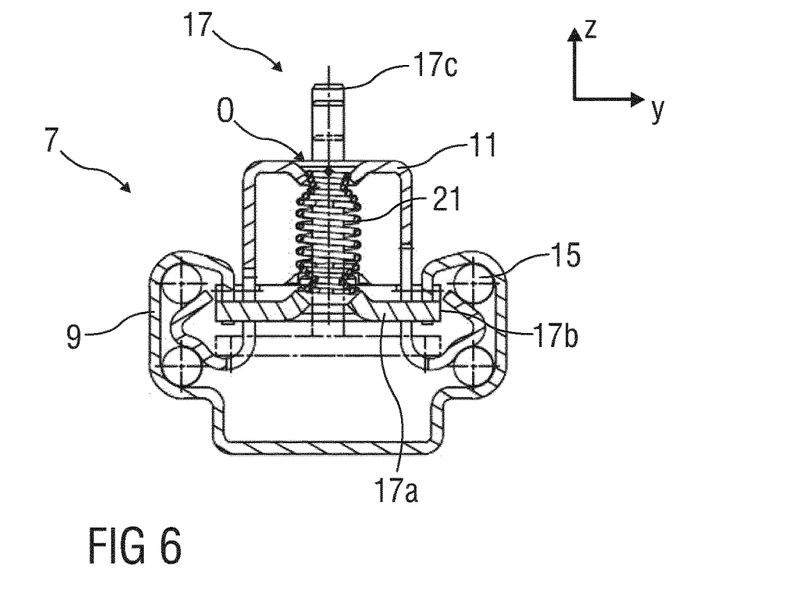
FIG. 6 is a schematic view showing a vertical section of the pair of rails in the y-z plane.

FIG. 6 shows a vertical section of a possible exemplary embodiment in the y-z plane. Arranged between the lower rail 9 and the upper rail 11 are balls 15 for the mutual guidance of the rails 9, 11, and therefore friction between said rails is reduced.

The connecting elements 17, 19 have a respective tension spring 21, wherein, in the section shown here, only the locking element 17 is illustrated. The locking elements 17, 19 are arranged in the upper rail 11 in the locking direction z. The tension spring 21 is arranged on the associated locking element 17, 19 and on the upper rail 11 and prestresses the locking element 17, 19 in the locking direction z.

FIG. 7 shows, in a side view, a detail of a latching geometry on the lower rail 9 of the pair of rails 7, illustrated in FIG. 3, with reference to the illustration shown in FIG. 5 in a transition region of the locking elements 17, 19. The latching tooth 19b has dropped into the catch 9d and is therefore in the locking position P2. The latching tooth 17b is arranged on the web 9c and is therefore in the prelocking position P1.

The first flank F1 belonging to the catch 9d has a very small inclination with an angle, for example, of 0° to 6°, in particular 3°, wherein a configuration for a particularly high level of crash safety and smaller tolerance compensation is possible.

The second flank F2 belonging to the catch 9d has a somewhat greater inclination of, for example, 3° to 10°, in particular 6°, in comparison to the flank F1. By this means, the configuration for traveling mode loads and a great tolerance compensation is achieved, and a disengaging of the locking position P2 in the event of crash impulses cannot be entirely ruled out. Crash loads in this direction are taken over after a small displacement by the illustrated latching tooth 17b of the locking element 17, in particular when the latching tooth 17b is in contact with the flank F4, in the prelocking position P1.

The flanks F3, F4 are what are referred to as load absorption flanks for the prelocking step and, at high impulses, absorb the resulting force before the locking position P2 arises. They are therefore not inclined in one embodiment and are therefore designed as vertical flanks or stops. In a further embodiment, the third flank F3 and/or the fourth flank F4, in particular the third flank F3, can be slightly inclined, for example at an angle of 0° to 6°, in particular 0° to 3°, in particular 3°.

Figure 8A:
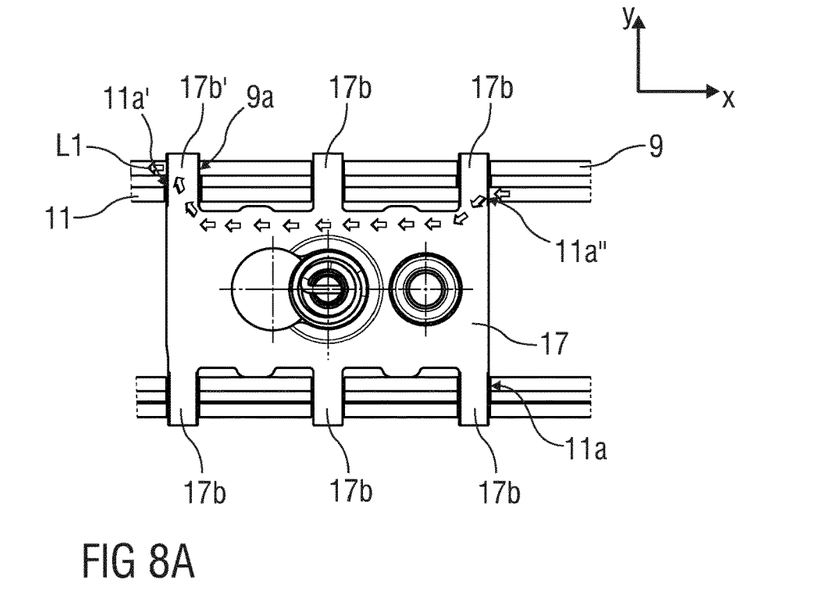
FIG. 8A is a schematic view showing in top view a first load path of the locking element.

FIG. 8A shows a first load path L1 of a locking element 17 which has two latching teeth 17b and a latching tooth 17b'. The latching teeth 17b on the right side in the longitudinal direction x and the central latching tooth 17b on the left side are latched in the recesses 11a. The vehicle front-side latching tooth 17b on the left side in the longitudinal direction x is latched into the conical recess 11a", and the rear-side latching tooth 17b' is latched into the wider recess 11a' and at the same time into the catch 9d. The force is therefore transmitted only from the upper rail 11 to the latching tooth 17b in the conical recess 11a" via the wide latching tooth 17b' to the lower rail 9.

Figure 8B:
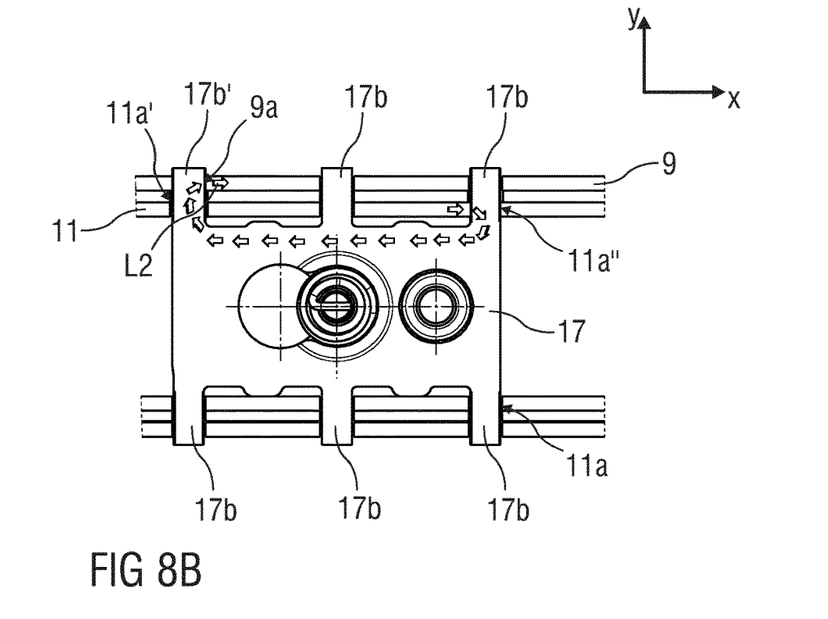
FIG. 8B is a schematic view showing in top view a second load path of the locking element.

FIG. 8B shows a second load path L2 of the locking element 17 illustrated in FIG. 8A, wherein the upper rail 11 is shifted to the right. The force is transmitted from the upper rail 11 to the latching tooth 17b in the conical recess 11a" via the wide latching tooth 17b' to the lower rail 9.

Figure 9:
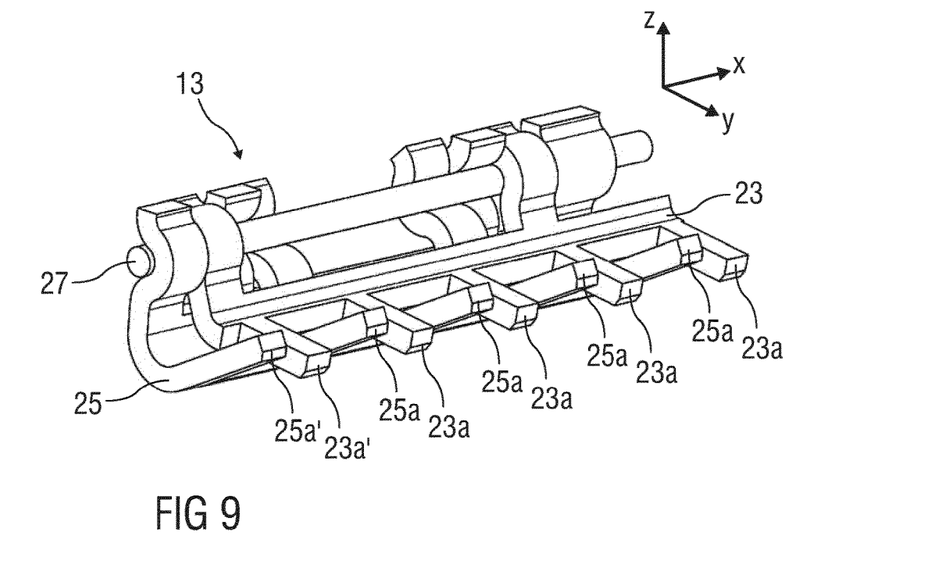
FIG. 9 is a schematic view showing a further exemplary embodiment of a locking unit.
Figure 10:
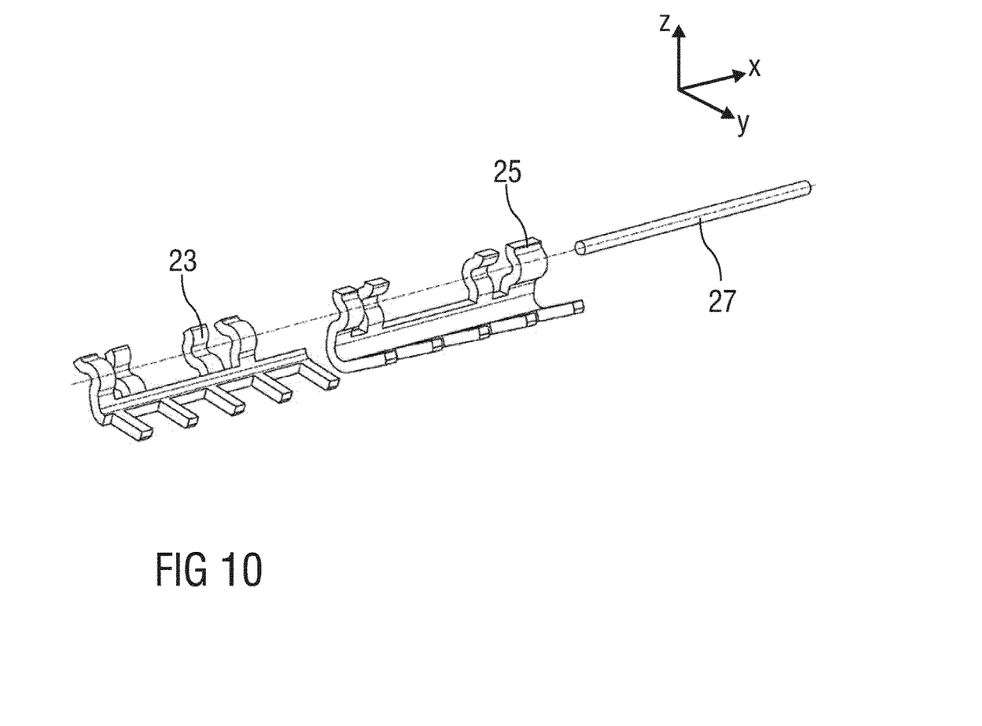
FIG. 10 is a schematic view showing components of the locking unit shown in FIG. 9.
Figure 11:
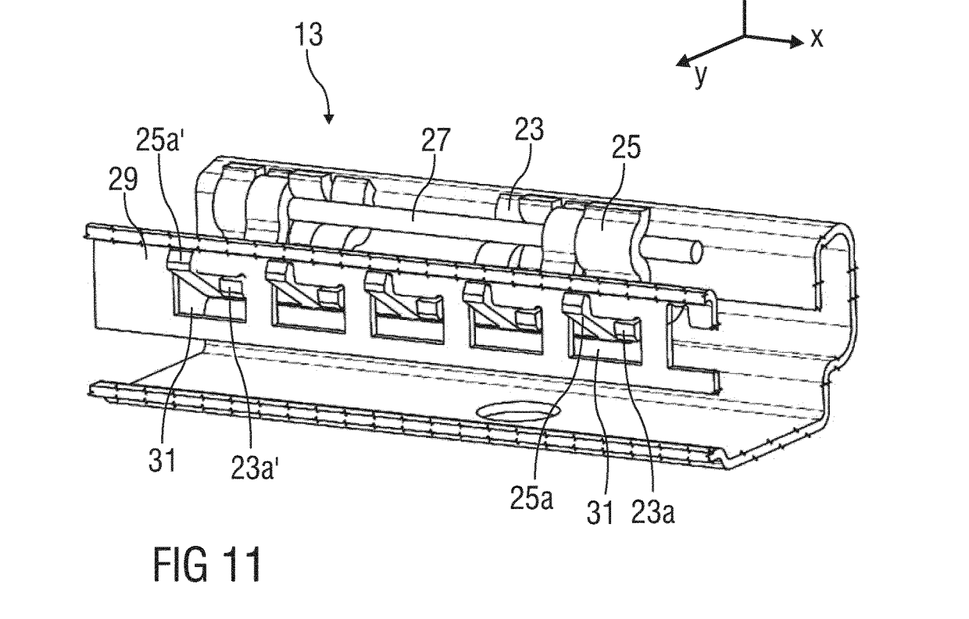
FIG. 11 is a schematic view showing a partially sectioned perspective partial view of the further exemplary embodiment.

FIGS. 9 to 11 show a further possible exemplary embodiment of a locking unit 13 in various views.

The locking unit 13 comprises locking elements 23, 25 which are of offset design in such a manner that they are arrangeable so as to movable by means of a locking rod 27 about the latter in the longitudinal direction x. A rail 29, in particular a lower rail 9, has a multiplicity of latching holes 31 in which the locking elements 23, 25 engage and permit locking of the rail 29. In this embodiment, the locking elements 23, 25 can be nested one inside the other in order to reduce the overall length of the locking unit 13.

The locking elements 23, 25 are of lever-shaped design. On the locking element 23, four latching teeth 23a are arranged at equal distances one behind another at the front in the direction of travel on the right longitudinal edge. One latching tooth 23a' is arranged adjacent to a latching tooth 23a at the rear in the direction of travel. The latching tooth 23a' is designed to be wider in the longitudinal direction x than the other latching teeth 23a.

On the locking element 25, four latching teeth 25a are arranged at equal distances one behind another at the front in the direction of travel on the right longitudinal edge. One latching tooth 25a' is arranged adjacent to a latching tooth 25a at the rear in the direction of travel. The latching tooth 25a' is designed to be wider in the longitudinal direction x than the other latching teeth 25a.

The latching teeth 23a, 25a of the locking elements 23, 25 are of identical design, and the latching teeth 23a', 25a' of the locking elements 23, 25 are of identical design.

Figure 12:
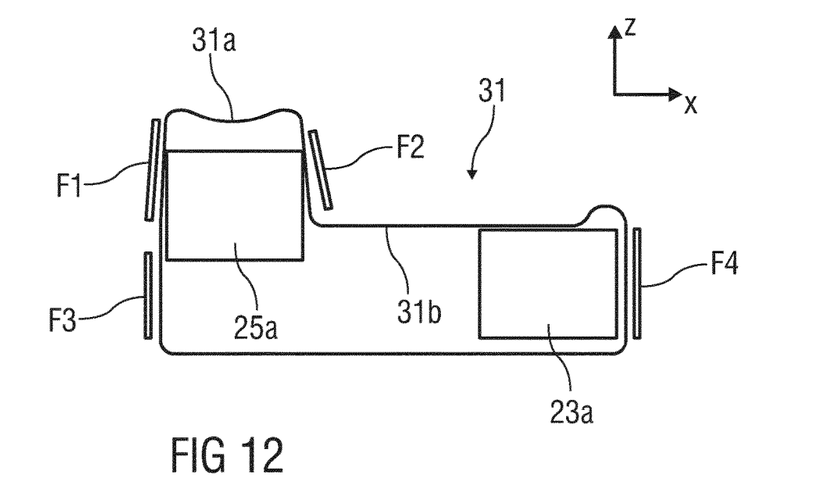
FIG. 12 is a schematic view showing in side view a latching hole of a further lower rail.

FIG. 12 shows the latching hole 31 of the rail 29 in a side view. The latching hole 31 is of L-shaped design and has a catch 31b, the flanks F1, F2 of which are of conical design in such a manner that the latching tooth 25a latches with play. The latching tooth 23a rests on a web 31b, wherein the latter is therefore arranged in the prelocking position P1.

An upper rail which is not illustrated in this exemplary embodiment has a number of formations receiving the latching teeth 23a, 23a', 25a, 25a', and therefore a force can be transmitted from the upper rail to the lower rail.

While specific embodiments of the invention have been shown and described in detail to illustrate the application of the principles of the invention, it will be understood that the invention may be embodied otherwise without departing from such principles.

The invention claimed is:

1. A longitudinal adjuster for a vehicle seat, the longitudinal adjuster comprising;
   at least one lower rail;
   at least one upper rail which is displaceable in a longitudinal direction in relation to the lower rail; and
   at least one locking unit for locking the upper rail in relation to the lower rail, wherein the locking unit comprises at least two locking mechanisms which, for the locking of the upper rail and the lower rail, engage in said upper rail and lower rail in a stepwise locking manner such that
   in a prelocking step, at least one of the locking mechanisms prelocks the upper rail and the lower rail to each other with play in relation to each other, and
   in a locking step, at least one of the locking mechanisms locks the upper rail and the lower rail to each other in a manner free from play in relation to each other, wherein one of the locking mechanisms has a multiplicity of latching teeth and is configured such that at least one of the latching teeth is wider than all of the other latching teeth.

2. A longitudinal adjuster as claimed in claim 1, wherein one or both of the locking mechanisms comprises a substantially plate-shaped locking element or a lever-shaped locking element.

3. The longitudinal adjuster as claimed in claim 1, further comprising an actuating element for locking or unlocking the locking unit, wherein, when the actuating element is actuated, the locking unit is bringable from a locking position into an unlocked position, and, after adjustment of the vehicle seat and with the actuating element unactuated, the locking unit is adjustable in a stepwise manner from the unlocked position via a prelocking position into the locking position.

4. The longitudinal adjuster as claimed in claim 3, wherein, when the actuating element is unactuated, one of the locking mechanisms is arranged in a prelocking position.

5. The longitudinal adjuster as claimed in claim 1, wherein the upper rail is provided with a number of recesses which corresponds to the number of the latching teeth of the locking mechanisms.

6. The longitudinal adjuster as claimed in claim 5, wherein the upper rail has a number of recesses in mutually opposite side walls per locking mechanism, wherein the recesses in the one side wall are identical and the recesses in the opposite side wall differ at least in one parameter.

7. The longitudinal adjuster as claimed in claim 6, wherein the recesses differing at least in one parameter are in the upper rail lying diagonally opposite one another.

8. The longitudinal adjuster as claimed in claim 5, wherein the locking element comprises a latching plate with latching teeth which are arranged one behind the other in the longitudinal direction on both longitudinal edges and are arranged moveably in a locking direction at least in corresponding recesses of the upper rail.

9. The longitudinal adjuster as claimed in claim 5, wherein the upper rail has, per locking mechanism, at least one recess which is wider in a longitudinal direction than the other recesses.

10. The longitudinal adjuster as claimed in claim 5, wherein the upper rail has, per locking mechanism, at least one recess which is of conical design in contrast to the other recesses.

11. The longitudinal adjuster as claimed in claim 10, wherein the recess is of conical design in a locking direction such that said recess guides a latching tooth of the associated locking mechanism such that said latching tooth latches in the locking position without play.

12. The longitudinal adjuster as claimed in claim 1, wherein the lower rail has a multiplicity of formations spaced apart at equal distances, wherein a formation in each case has a projection, a web and a catch.

13. The longitudinal adjuster as claimed in claim 12, wherein the catch is of conical design at has flanks such that the at least one of the latching teeth of the one of the locking mechanisms latches without play.

14. A vehicle seat comprising a longitudinal adjuster, the longitudinal adjuster comprising:
   at least one lower rail;
   at least one upper rail which is displaceable in a longitudinal direction in relation to the lower rail; and
   at least one locking unit for locking the upper rail in relation to the lower rail, wherein the locking unit comprises at least two locking mechanisms which, for the locking of the upper rail and the lower rail, engage in said upper rail and lower rail in a stepwise locking manner such that in a prelocking step, at least one of the locking mechanisms prelocks the upper rail and the lower rail to each other with play in relation to each other, and in a locking step, at least one of the locking mechanisms locks the upper rail and the lower rail to each other in a manner free from play in relation to each other, wherein one of the locking mechanisms has a multiplicity of latching teeth and is configured such that at least one of the latching teeth is wider than all of the other latching teeth.

15. A vehicle seat as claimed in claim 14, wherein one or both of the locking mechanisms comprise a substantially plate-shaped locking element or a lever-shaped locking element.

16. A vehicle seat as claimed in claim 14, wherein the longitudinal adjuster further comprises an actuating element for locking or unlocking the locking unit, wherein, when the actuating element is actuated, the locking unit is bringable from a locking position into an unlocked position, and, after adjustment of the vehicle seat and with the actuating element unactuated, the locking unit is adjustable in a stepwise manner from the unlocked position via a prelocking position into the locking position.

17. A vehicle seat as claimed in claim 16, wherein, when the actuating element is unactuated, one of the locking mechanisms is arranged in a prelocking position.

18. A vehicle seat as claimed in claim 14, wherein the upper rail is provided with a number of recesses which corresponds to the number of the latching teeth of the locking mechanisms.

* * * * *